United States Patent [19]

Louie

[11] 3,950,123

[45] Apr. 13, 1976

[54] APPARATUS FOR MAKING A FOOD PRODUCT

[76] Inventor: Edward Louie, 14 Otis St., San Francisco, Calif. 94103

[22] Filed: Feb. 6, 1974

[21] Appl. No.: 440,110

[52] U.S. Cl.............. 425/500; 425/518; 425/126 R
[51] Int. Cl.²......................................... A21C 11/00
[58] Field of Search .......... 425/500, 518, 383, 397, 425/110, 126 R; 99/450.1

[56] References Cited
UNITED STATES PATENTS

| | | | |
|---|---|---|---|
| 3,265,016 | 8/1966 | Cheung | 425/112 X |
| 3,605,642 | 9/1971 | Brown | 425/500 X |
| 3,669,007 | 6/1972 | Pulici | 425/110 X |

Primary Examiner—Francis S. Husar
Assistant Examiner—David S. Safran
Attorney, Agent, or Firm—Townsend and Townsend

[57] ABSTRACT

Apparatus and method for forming a specialty food product, such as a fortune cookie wherein a flat, flexible cake, after being cooked, is placed on a first, flat, fixed surface and is shifted by continuously moving pins over the first surface and onto a second, flat fixed surface having a slot therethough. A continuously moving suction device removes a strip of paper from a stack and places the strip on the cake on the second surface and forces the cake into the slot to fold the same about a first axis until the cake halves formed by the fold are generally parallel with each other. As the folded cake moves downwardly in the slot, a pair of continuously rotating arms engage respective ends of the cake and fold it about a second axis which is substantially perpendicular to and slightly below the first axis. The second fold is made about a shiftable support lever which is fixed at least during the initial part of the second fold but which shifts downwardly to allow release of the resulting cake product for movement by a conveyor for transfer to a remote receiving station. The produce cools and becomes relatively rigid after the second fold.

14 Claims, 13 Drawing Figures

APPARATUS FOR MAKING A FOOD PRODUCT

This invention relates to improvements in the making of a food product having a distinctive shape, such as a fortune cookie and, more particularly, to apparatus and a machine-operated method for making such a food product.

BACKGROUND OF THE INVENTION

Fortune cookies are now generally made by hand. They are made by folding a flexible, flat, circular thin cake several times immediately after the cake is removed from a griddle in which it is cooked and after a paper strip containing a printed fortune has been placed adjacent to the cake so as to be contained in the cookie after the folding process. Initially, the person making the fortune cookie places the paper strip in the center of the cake, then folds the cake to form two generally parallel sides. The folded cake is then folded a second time by moving it onto structure defining a horizontal edge, such as the upper edge of a vertically disposed sheet. The shaped cake or fortune cookie is thereafter placed on a conveyor and moved to a remote location while cooling to a generally rigid condition. While the hand method of making fortune cookies is satisfactory, assuming they are made by skilled persons, it is a tedious job and becomes monotonous requiring frequent breaks in the job routine with the results being a relatively low output per unit of working time.

Attempts to make fortune cookies by machine have been made but, for the most part, such attempts have resulted in machines with certain drawbacks which affect not only the quality of the finished product but also require considerable machine maintenance to keep the yield of finished fortune cookies at a high level.

SUMMARY OF THE INVENTION

The present invention is directed to improvements in the technique of making a shaped food product and is especially suitable for use in automatically making fortune cookies to avoid the need for the manual handling of the product once the operation is commenced. The invention eliminates the problems mentioned above and, in practice, greatly increases the product output per unit time so as to minimize production costs without sacrificing the quality of the finished product.

To achieve the foregoing aims, the invention includes an apparatus and a method for making a food product which has a distinctive shape wherein certain machine components sequentially receive a flexible, initially flat, thin cake immediately after it has been removed from a cooking grill. Such components then move the cake to a location at which other components shape the same, all within a very short time so that a relatively large number of such products can be made and can be ready for marketing in a minimum of time and with minimum operator supervision. As the product is being made, there is no operator handling of the same. The product only contacts the various machine components which can be maintained in a clean condition to insure against contamination of the product.

The primary object of this invention is to provide an improved apparatus and a method for forming a food product having a distinctive shape wherein the product can be automatically folded by machine components along a pair of mutually perpendicular axes in timed relationship while the product is still flexible after being cooked and prior to being cooled to a rigid form so as to eliminate the need for manually forming the product and to eliminate labor and expense associated therewith.

Another object of this invention is to provide an apparatus and a method of the type described wherein the product is in the nature of a fortune cookie which can be precisely folded to make a high quality product which need not be manually handled at any time during shaping operations.

Another object of this invention is to provide apparatus for making a fortune cookie wherein the apparatus can be completely automatic to provide a maximum product output with substantially no operator supervision.

Other objects of this invention will become apparent as the following specification progresses, reference being had to the accompanying drawings for an illustration of the machine for carrying out the present method.

The apparatus for making a shaped food product of this invention is broadly denoted by the numeral 10 and will hereinafter be described with reference to the making of a fortune cookie which, as is well-known, comprises a shaped cookie containing a strip of paper on which is written a "fortune".

Apparatus 10 includes a fixed, generally horizontal plate structure 11 having a central surface 12 and a pair of side surfaces 14 and 16 spaced from central surface 12. Surfaces 12, 14 and 16 are adapted to support a generally circular cake 13 and to allow the cake to slide over such surfaces from one end of plate structure 11 to its opposite end adjacent to abutment means 20. The size of cake 13 is such that it extends completely across central surface 12, and is partially supported at its outer extremities by surfaces 14 and 16, thereby spanning the slots 19 formed by the spacing of surfaces 14 and 16 from central surface 12.

Means is provided for advancing a cake 13 to a position overlying a slot or passage 18. Such means includes a continuously moving, endless, flexible belt 23 for each side, respectively, of central surface 12. Each belt 23 is coupled to a pair of pulleys or sprockets 25 and 27 rotatable about respective shafts 29 and 31. Each belt 23 has a pair of lugs 33 and 35 which pass through respective slots 19 and 21 and are adapted for engaging cakes 13 to advance the same in the direction of arrow 11a. Projection 33 of one belt 23 is aligned with the corresponding projection 33 of the other belt 23 for simultaneously engaging a first cake 13 and for advancing the same. Similarly, projections 35 of the two belts are also aligned with each other for simultaneously engaging and advancing a second cake 13. Thus, cake 13 can be successively directed over plate structure 11 and onto a flat plate 15 having a flat, upper supporting surface 17 provided with slot or passage 18 transverse to the direction of travel of the cake over surfaces 12, 14 and 16.

Figure 4:
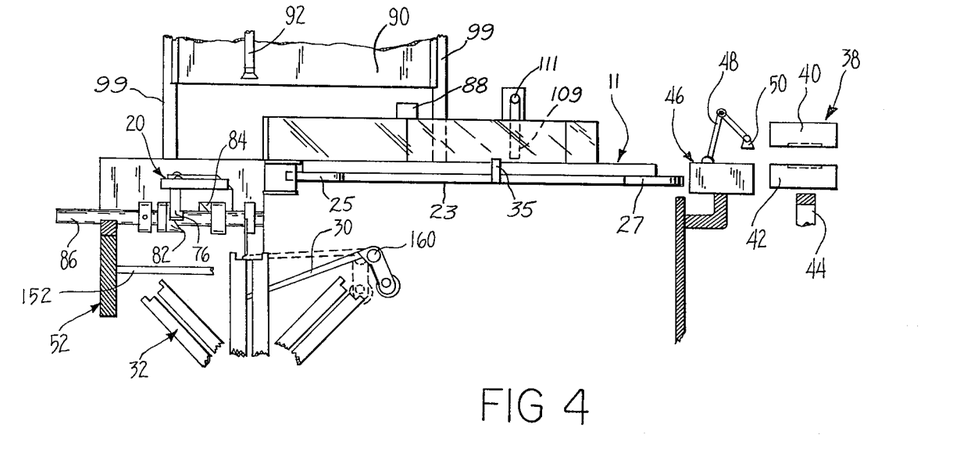
FIG. 4 is a cross-sectional view looking in the direction of line 4—4 of FIG. 2.
Figure 5:
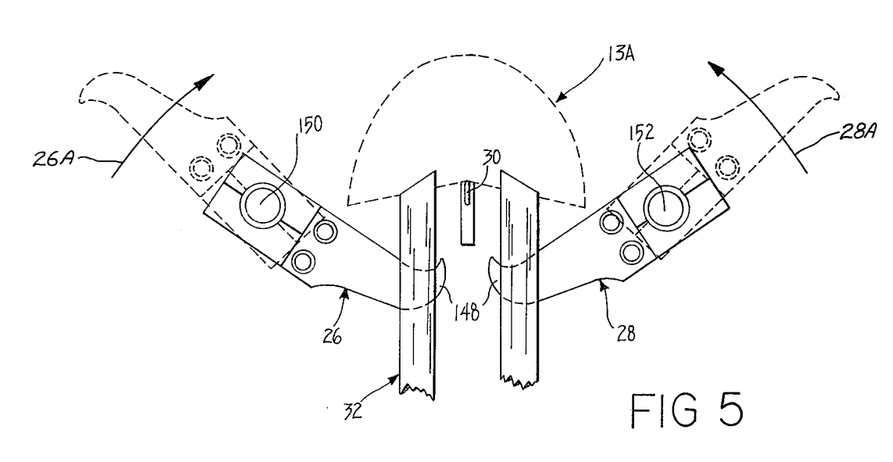
FIG. 5 is an enlarged, fragmentary, front elevational view of the arms for folding the product along a first axis after the product has been folded along a second axis perpendicular to the first axis.

Abutment means 20 near the front end of plate 15 limits the forward travel of cake 13 after it has moved off surfaces 12, 14 and 16. Means 20 also symmetrically places the cake over passage 18. A suction device 21 above plate 15 operates to pull the lowermost strip 22 of paper (FIG. 1A) from a stack 24 of such strips 22 and deposits the strip on the flat upper surface of cake 13 on supporting surface 16. Device 21 also pushes the cake into the passage to cause the cake to fold about a first axis aligned with the passage; thus, the cake is folded into two halves. A pair of arms 26 and 28 (FIG. 5), which continuously rotate in opposite directions, operate to fold or bend the cake about a second axis transverse to the first axis and midway between the ends of the cake (FIG. 5). The second axis is defined by a supporting arm 30 (FIGS. 4 and 5) disposed centrally of the cake halves (FIG. 5). The cake is then lowered and is received by a conveyor wheel 32 and advanced to a cooling wheel 34 from which the product is deposited in a box or container 36 remote from the shaping area.

Apparatus 10 can be utilized adjacent to a cooker unit 38 (FIG. 4) which cooks the batter for forming the cake, unit 38 having a plurality of pairs of upper and lower griddle plates 40 and 42 which can automatically be opened and moved by a conveyor 44 along a predetermined path past apparatus 10. If desired, an automatic feed mechanism 46, such as an arm 48 having a suction pickup member 50, can be used to automatically pick up a cooked cake from between an adjacent pair of griddle plates 40 and 42 when the latter are open and place the same on the upper stretch of conveyor 12. The operation of arm 48 can be timed with respect to the position of each pair of griddle plates so that member 50 can operate automatically to pick up a cake 13 when a pair of griddle plates are adjacent to and in alignment with conveyor 12.

GENERAL OPERATION

Apparatus 10 is placed in operation when individual cakes 13 made by cooker 38 are either manually removed from between a pair of adjacent plates 40 and 42 or automatically removed therefrom by the use of feed mechanism 46. Each cake 13 is placed on plate structure 11 and one pair of the continuously moving lugs 33 and 35 advances the cake toward and onto supporting surface 16. The cake tends to continue forwardly by virtue of its inertia but is stopped by abutment means 20 and shifted slightly rearwardly so that the cake will be symmetrically centered over passage 18. As the cake moves toward supporting surface 16, suction device 21 is elevated, removes the lowermost strip 22 from stack 24 by suction and is then lowered and caused to place the strip on the cake over the pressure. Device 21 also continues downwardly for a short distance and, in doing so, forces the cake into passage 18 to fold the same into two halves along a first axis parallel with passage 18. During this time, arms 26 and 28 continuously rotate in opposite directions and their movements are timed with respect to the movements of lugs 33 and 35 so that they engage the upper surface of the cake and fold the same about a second axis perpendicular to the first axis and defined by the upper edge of arm 30. Then, arm 30 is lowered to allow the shaped product to be received on wheel 32 by means of which it is rotated through an arc of approximately 90° and is transferred to a wheel 34 which rotates the same through an angle of approximately 135° during which the product is cooled to a rigid consistency and finally deposited in container 36.

DETAILED CONSTRUCTION

Apparatus 10 has a main support 52 (FIG. 1) which includes a pair of generally upright sides 54 and 56 which are supported on a floor surface by suitable legs or other structure. Plate 15 is horizontal and spans the distance between sides 54 and 56. Plate structure 11 is mounted in any suitable manner between sides 54 and 56 as are belts 23. Surface 16 has spaced surface portions 62 and 64 (FIG. 2) slightly below the horizontal plane of surfaces 12, 14 and 16.

Abutment means 20 is movable continuously forwardly and rearwardly over surface portion 64 by virtue of being connected to a continuously reciprocal cross bar 66 extending transversely of the path of a cake 13. Cross bar 66 is connected to a power drive or motor which is continuously operable. Abutment means 20 has a pair of interconnected sides 68 and 70 which are engaged by the cake as it moves off the conveyor. These sides shift the cake rearwardly and against a pair of fixed abutment surfaces 72 and 74 on the opposite side of passage 18 from abutment means 20 so that the cake will be properly centered over passage 18. The purpose of the rearward shifting of cake 13 by abutment means 20 is to compensate for any bounce of the cake as it moves onto supporting surface 16.

Figure 6:
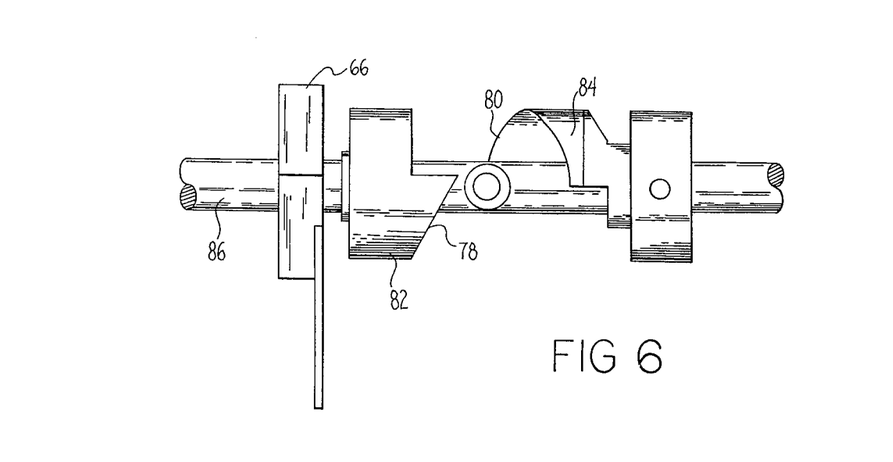
FIG. 6 is an enlarged, side elevational view of the means for reciprocating the abutment used to center the product over a forming slot of the machine.

Bar 66 is reciprocated continuously to effect the continuous forward and reverse movement of abutment means 20. To this end, bar 66 has a lower projection 76 (FIG. 4) which is engaged successively by a pair of cam edges 78 and 80 (FIG. 6) on respective cam members 82 and 84 rigidly secured to a rotatable shaft 86 (FIGS. 4 and 6) carried on support 52 in some suitable manner. A drive means (not shown) is provided on support 52 to continuously rotate shaft 86 in timed relationship to the movement of lugs 33 and 35 through slots 19. Thus, abutment means 20 will move rearwardly immediately after a cake 13 moves onto surface 16 and engages abutment means 20. The purpose of cam edges 78 and 80 is to shift bar 66 and thereby abutment means 20 in opposite directions successively and continuously. Edge 78 is disposed to engage projection 76 to cause it to be moved rearwardly to cause abutment means 20 to center the cake over passage 18. Immediately after this occurs, edge 80 engages projection 76 and moves bar 66 and abutment means 20 forwardly to return it to its starting position. The rotation of shaft 86 continues so that abutment means 20 continuously moves back and forth in timed relationship to the movement of lugs 33 and 35.

Figure 2:
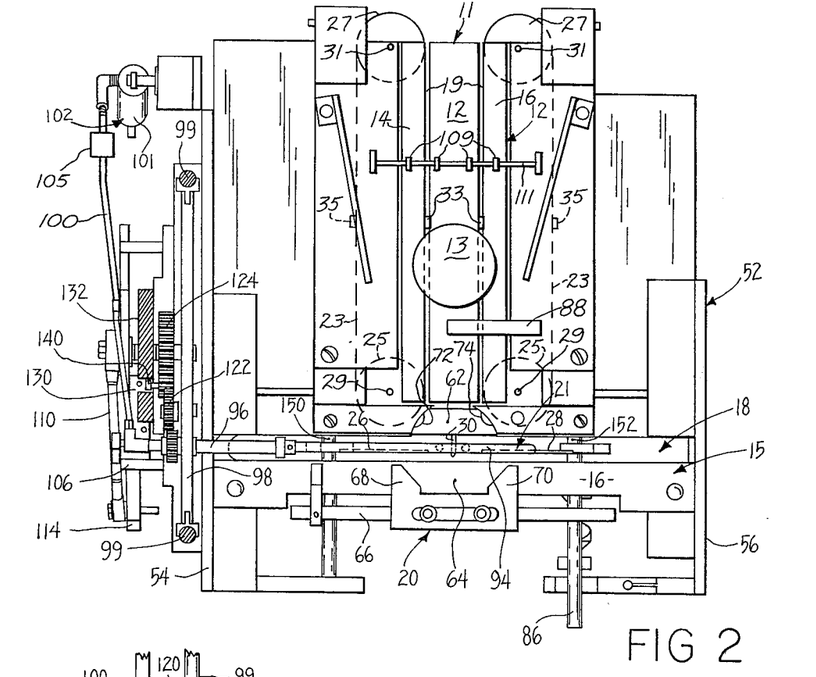
FIG. 2 is a top plan view of a portion of the machine.
Figure 3:
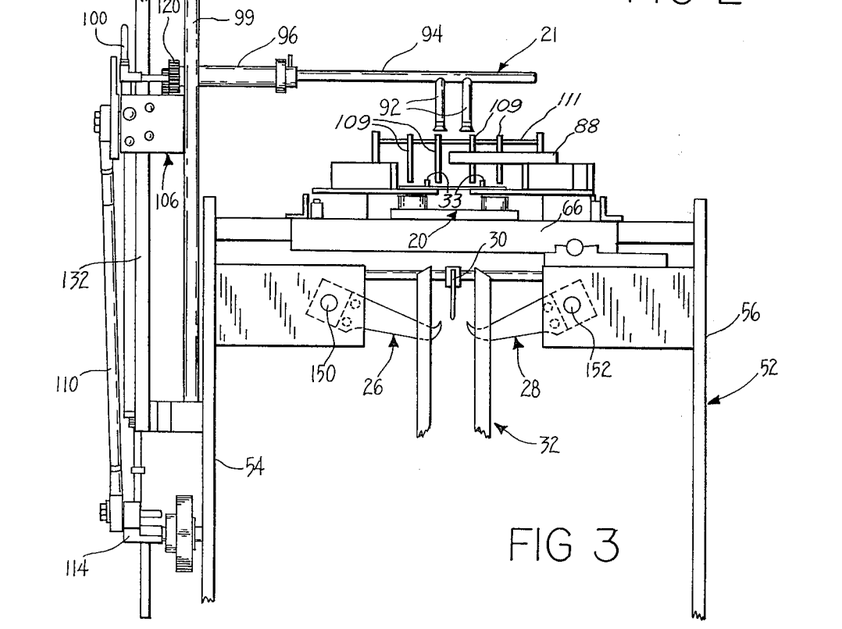
FIG. 3 is a fragmentary, front elevational view of the machine, parts being broken away to illustrate details of construction.

Suction device 21 includes one or a pair of side-by-side suction tubes 92 (FIGS. 1 and 3) carried by a manifold 94 adapted to be alternatively coupled to a source of vacuum and a source of positive air pressure. Manifold 94 can be coupled to any suitable structure for up and down movement and, as it moves up and down, the manifold pivots about its longitudinal axis so that suction tubes 92 extend upwardly from the manifold as the latter moves upwardly toward stack 24 (FIG. 1A), and tubes 92 extend downwardly as manifold 94 moves downwardly toward surface 16. One form of the manifold mounting structure includes a sleeve 96 mounted for up and down movement on a vertical slide plate 98 slidably supported between a pair of upright posts 99 secured to and extending upwardly from side 54. The end of manifold 94 remote from sleeve 96 is closed and the other end of the manifold is coupled by a flexible tube 100 to one end of a cylinder 101 (FIGS. 2, 7, 8 and 9) of a fluid piston and cylinder assembly 102.

Figures 1, 1A:
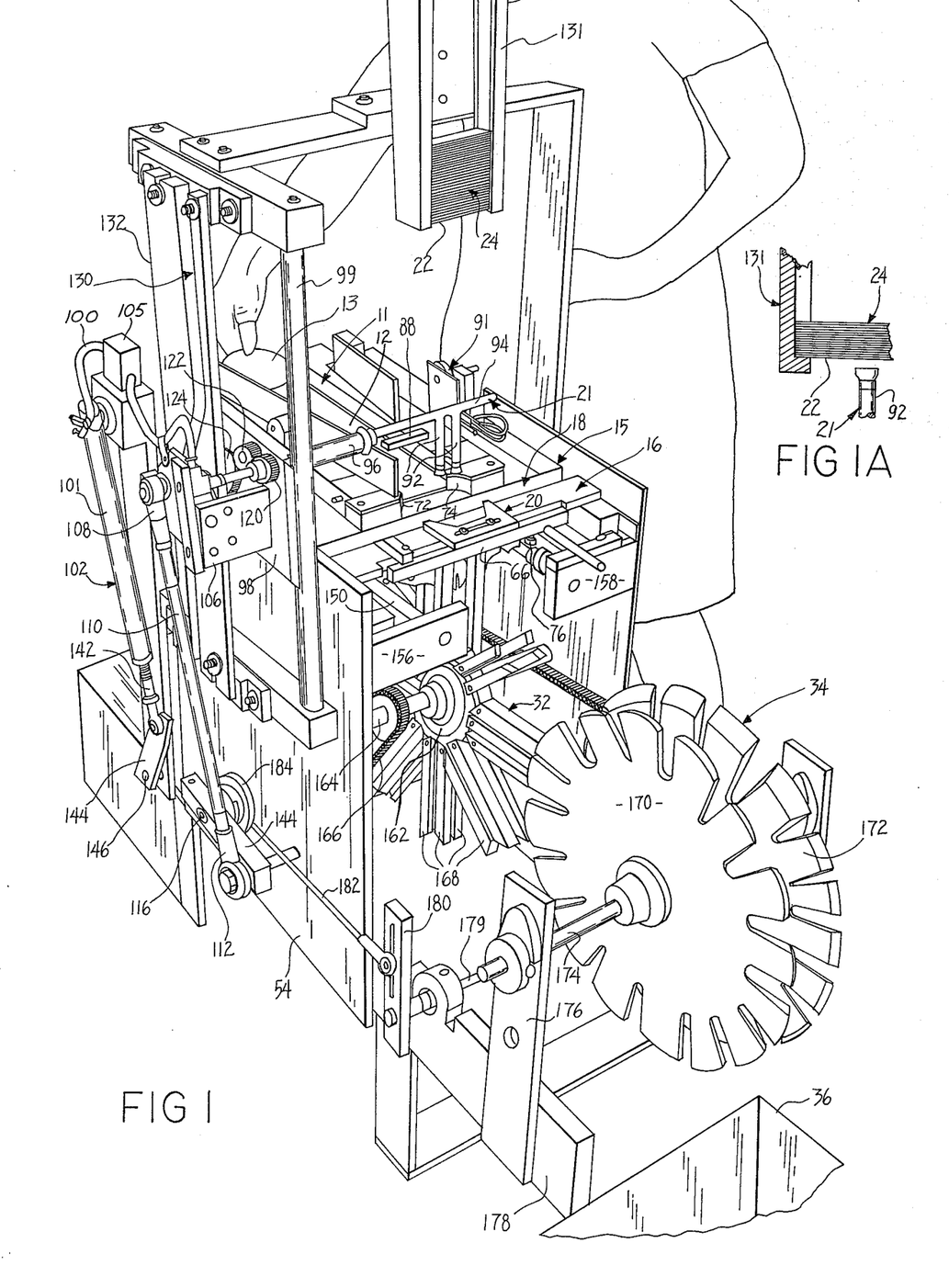
FIG. 1 is a perspective view of the machine.
FIG. 1A is a cross-sectional view taken along line 1A—1A of FIG. 1.

Plate 98 has connecting structure 106 extending laterally therefrom (FIGS. 1–3), and the upper end 108 of a drive rod 110 is pivotally coupled to structure 106, rod 110 having its lower end 112 pivotally mounted to the outer end of a rotating arm 114 (FIG. 1) mounted on a shaft 116 for rotation about a generally horizontal axis. A drive source is provided for shaft 116 to cause it to rotate continuously and thereby cause continuous up and down movement of plate 98 in timed relationship to the movement of lugs 33 and 35 (FIGS. 1B and 1C).

Figure 7:
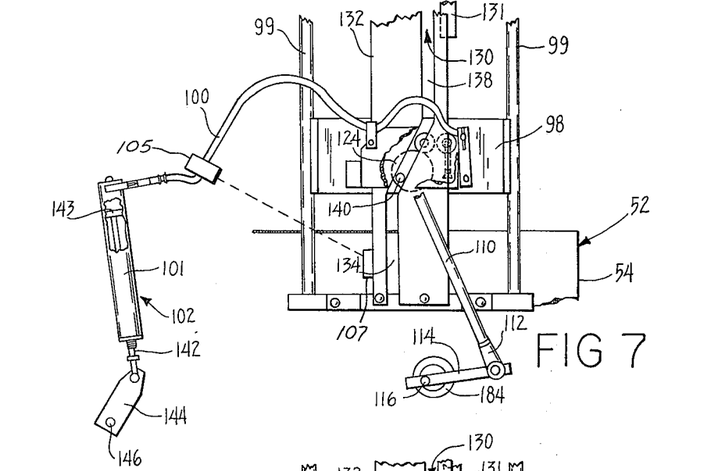
FIGS. 7, 8 and 9 are fragmentary, side elevational views of the apparatus for shifting the suction device used to place paper strips on the product supported near the abutment.
Figure 8:
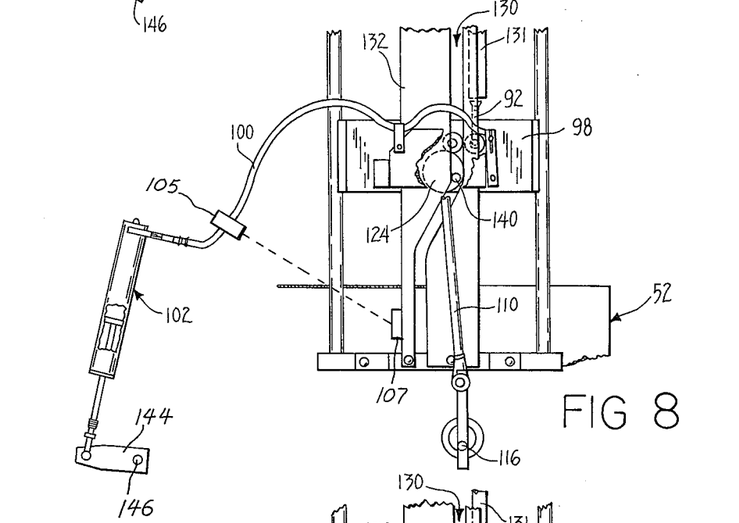
Figure 9:
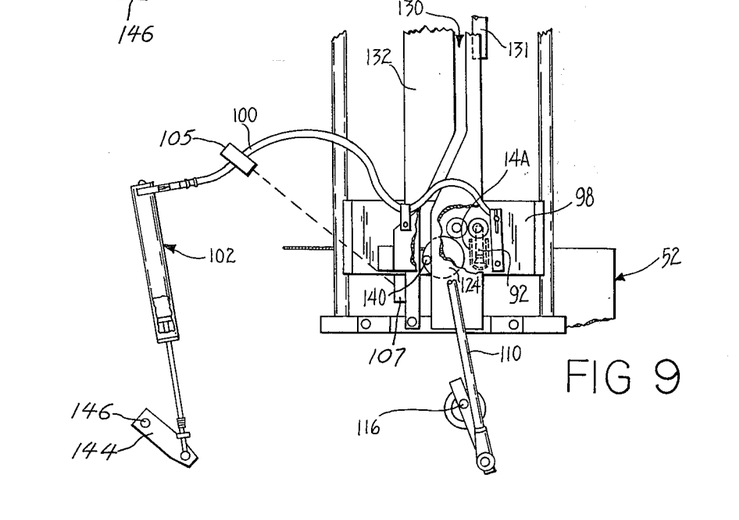

To rotate manifold 94 as plate 98 moves up and down, a first spur gear 120 is coupled to the manifold and is in mesh with a second, idler spur gear 122 mounted for rotation on plate 98. Gear 122 is in mesh with a third gear 124 rotatably mounted on plate 98, gear 124 having an off-center projection 126 (FIGS. 7, 8 and 9) which is shiftably carried in a slot 130 of a vertical plate 132 secured to and extending upwardly from side 54. The shape of slot 132 is shown in FIGS. 7, 8 and 9 and is designed to cause rotation of manifold 94 through an arc of 180° as plate 98 is elevated to, in turn, rotate suction tubes 92 into upwardly extending positions. Then, as plate 98 moves downwardly, slot 132 causes rotation of manifold 94 so that tubes 92 move into downwardly extending positions (FIG. 1).

As shown in FIG. 7, slot 130 has a vertical lower stretch 134, inclined central stretch 136, and a vertical upper stretch 138, stretch 136 interconnecting stretches 132 and 138. Off-center projection 126 extends into slot 130 and is movable through lower stretch 134, through central stretch 136 and into and through upper stretch 138 and return. As projection 126 moves upwardly in stretch 134, manifold 94 does not rotate relative to sleeve 96; however, the manifold and the sleeve translate upwardly together. As projection 140 moves through central stretch 136, the manifold and sleeve continue to translate but the manifold also rotates since spur gear 124 is caused to rotate due to the camming action of stretch 136 on projection 126. Spur gear 124 rotates through an angle sufficient to cause rotation of manifold 94 through an arch of approximately 180° relative to sleeve 96. This causes suction tubes 92 to move from their downwardly extending positions of FIG. 1 to their upwardly extending positions at which they are aligned with the lowermost strip 22 of stack 24 carried by the strip magazine 131. Continued upward movement of slide plate 98 causes projection 126 to enter upper stretch 138 and when this occurs, the manifold and sleeve translate as a unit and suction tubes 92 move into engagement with the lowermost strip 22 of stack 24. When this occurs, a suction force is present at the outer ends of suction tubes 92 as hereinafter described to cause lowermost strip 22 to adhere to the outer ends of tubes 92. Then, the movement of slide plate 98 is reversed, reversing the aforesaid movement of manifold 94 and sleeve 96 by virtue of the downward movement of projection 126 successively through stretch 138, through stretch 136 and into and through stretch 134. Lowermost strip 22 is thereby pulled from stack 24 and carried toward and placed on a cake 13 on plate 15. The reciprocation of slide plate 98 is effected by the rotation of arm 114 due to the rotation of shaft 116.

Piston and cylinder assembly 102 (FIGS. 7–9) is provided to create the suction force mechanically at the outer ends of suction tubes 92. The upper end of cylinder 101 is pivotally connected to an upright post 53 (FIG. 1) of support 52. Piston rod 142 coupled to piston 143 (FIG. 7) projects outwardly and downwardly from the cylinder, the lower end of rod 142 being pivotally mounted on a continuously rotating arm 144 which is continuously rotated about the axis of a shaft 146 which, in turn, is continuously rotated by a drive means to cause piston rod 142 to be continuously raised and lowered with respect to cylinder 101.

As plate 98 is elevated, rod 142 is lowered relative to cylinder 101, thereby creating a suction force at the upper end of cylinder 101. A solenoid valve 105 couples the upper end of cylinder 101 to tube 100 to control the application of the suction force to manifold 94 and thereby to the outer ends of suction tubes 92. The valve is opened when a cake 13 is sensed by an electric eye device 103 (FIGS. 1–3) and as tubes 92 move toward and approach the lowermost strip 22 of stack 24. When no cake is present during such upward movement of the suction tubes, valve 105 is closed and no suction force is applied to suection tubes 92.

Conversely, as slide plate 98 is lowered, rod 143 is moved upwardly with respect to cylinder 101, thereby eliminating the suction force and creating positive air pressure which causes sufficient air to exit from the suction tubes 92 to effectively force the strip off the latter. This occurs as the outer ends of suction tubes 92 approach the cake 13 on supporting surface 16 and as valve 105 remains open so that the strip is positively placed on the cake. Thereafter, a switch 107 (FIGS. 7–9) is actuated by the downward movement of plate 98 and causes valve 105 to close, thereby breaking the fluid connection between manifold 94 and cylinder 101.

The movement of plate 98 is sufficient to cause suction tubes 92 to move into engagement with the lowermost strip 22 when the slide plate 98 approaches the upper end of its path of travel. Similarly, slide plate 98 moves to a downward location corresponding to a position at which the lower ends of the suction tubes 92 force cake 13 into passage 18 to fold the cake about an axis parallel with the passage. This causes the cake to be folded into two halves (FIG. 5). The dashed line figure denoted by numeral 13A in FIG. 5 represents cake 13 after it has been folded once by virtue of being forced into passage 18. Since the cake, before being folded, is symmetrically located over the passage by abutment means 20, the two halves of the cake are of substantially the same size and their outer peripheral margins are aligned with each other after the first fold.

Arms 26 and 28 (FIG. 5), used for folding the cake a second time, are substantially identical in construction in that they are provided with outer, convex, cake-engaging margins or edges 148. These margins are adapted to move into engagement with the upper surface of cake 13A at the opposed ends of the first fold and then to fold such ends downwardly and about arm 30 to effect the second fold of the cake, the second fold being about an axis substantially perpendicular to the axis of the first fold.

Arms 26 and 28 are secured to respective shafts 150 and 152 which are mounted for rotation in opposed directions to each other about generally horizontal axes on structure including a pair of end plates 156 and 158 (FIG. 1) secured to support 52. Arms 26 and 28 are coupled to an actuatable drive means which continuously rotates them in the directions of arrows 26A and 28A (FIG. 5). The dashed line positions of arms 26 and 28 shown in FIG. 5 indicate intermediate operative positions prior to their moving into engagement with the cake represented by the numeral 13A.

Arm 30 is mounted on a shaft 160 (FIG. 4) for reciprocation through a small arc in a vertical plane. Arm 30 extends across the path of downward movement of cake 13A and is normally stationary as arms 26 and 28 engage the upper surface of cake 13A and bend or fold the same about arm 30, the latter serving as a fulcrum, thereby causing the ends of cake 13A to rotate downwardly through an arc of about 90°. After the second fold has been substantially completed, arm 30 moves downwardly a short distance so that the finally shaped cake product can be received by conveyor wheel 32. The downward movement of arm 30 is accomplished in time relationship to the continuous rotation of arms 26 and 28.

Conveyor wheel 32 (FIG. 1) includes a hub 162 mounted on a shaft 164 which spans the distance between and is coupled with sides 54 and 56. A chain drive 166 couples shaft 164 to a drive means. Wheel 32 has a plurality of product carriers arranged circumferentially on hub 162. Each carrier includes four legs 168 whose outer ends are beleved to receive a finally shaped cake product. The product is gently held between the outer ends of legs 168 and wheel 32 rotates intermittently to assure that there is a set of four legs 168 ready to receive a product each time arm 30 is lowered. After wheel 32 has moved the product through an arc of approximately 90°, the product is then transferred to cooling wheel 34 (FIG. 1).

Wheel 34 includes a pair of spaced side plates 170 and 172 having slotted and beveled outer peripheries which provide a means for receiving products from wheel 32 and for holding the products as the latter are moved through an arc during which time the products cool to a generally rigid condition. Plates 170 and 172 are secured to a shaft 174 mounted for rotation on a pair of rigid, upright, bars 176 secured to and extending upwardly from a pair of extensions 178 rigid to sides 54 and 56. Means is provided for incrementally rotating wheel 34 in a clockwise sense when viewing FIG. 1. Such means includes a ratchet (not shown) coupled by a shaft 179 to an arm 180 having a link 182 coupled to an eccentric 184 mounted on shaft 116. As shaft 116 rotates, eccentric 184 reciprocates link 182 through a predetermined distance, causing rotation of shaft 179 and a resulting incremental rotation of wheel 34. As wheel 34 progressively rotates, the products carried thereby eventually move over container 36 and gravitate thereinto.

Figure 10:
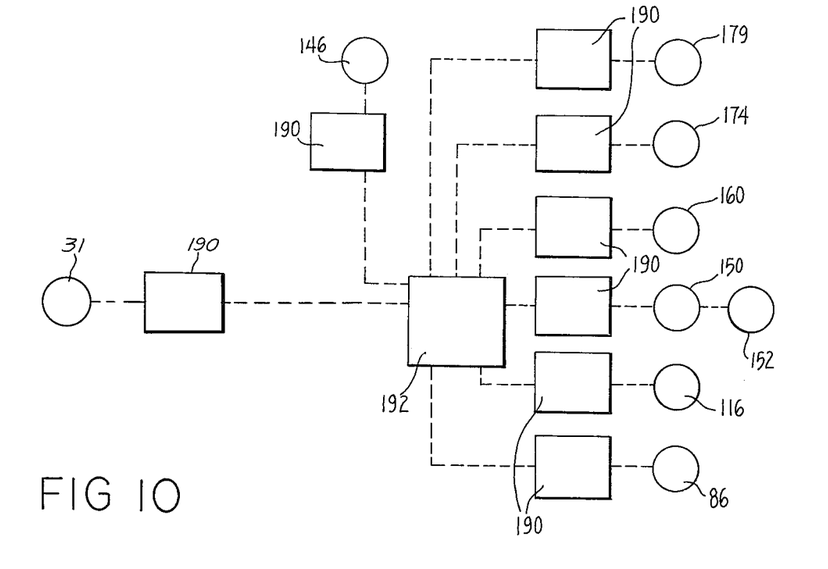
FIG. 10 is a block diagram of the way in which the various operating components of the apparatus are coupled together in timed relationship.

FIG. 10 illustrates how a single continuously operable drive source can be provided for shafts 31, 86, 116, 146, 150, 152, 160, 174 and 178 and for arm 48 of feed mechanism 46. All of these components are provided with suitable gear-up or gear-down mechanisms 190 so that they will move as required in timed relationship with each other to accomplish the various functions of apparatus 10 yet assure the proper formation of the finally shaped product. For purposes of illustration, the single source for driving the various shafts is an electric motor and is denoted by the numeral 192. The foregoing shafts thus rotate even though there is no cake 13 moving over surfaces 12, 14 and 16. A plurality of pivotal fingers 109 (FIGS. 1B and 4) depend from and are pivotal relative to a cross-rod 111 coupled to sides 52 and 54 to hold back a cake 13 if it happens to be placed on lugs 33 or lugs 35. When so held back, the cake waits for the next pair of lugs to advance it forwardly. The lower ends of fingers 109 are spaced above central surface 12 by a distance less than the thickness of a cake 13.

Figure 11:
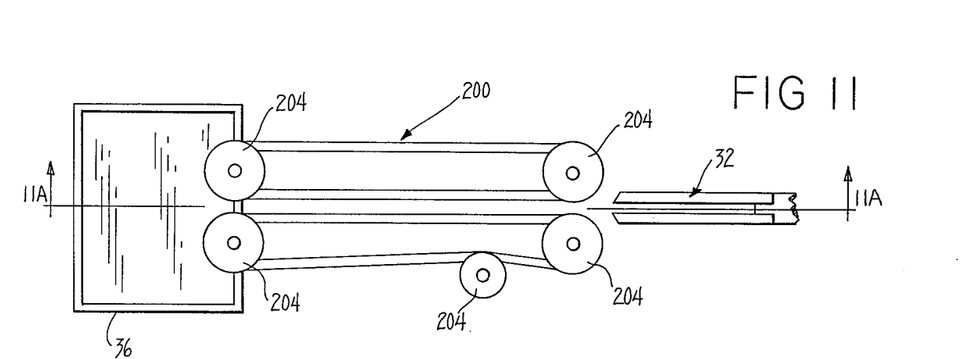
FIG. 11 is a top plan view of a second form of a coupling device of the apparatus.
Figure 11A:
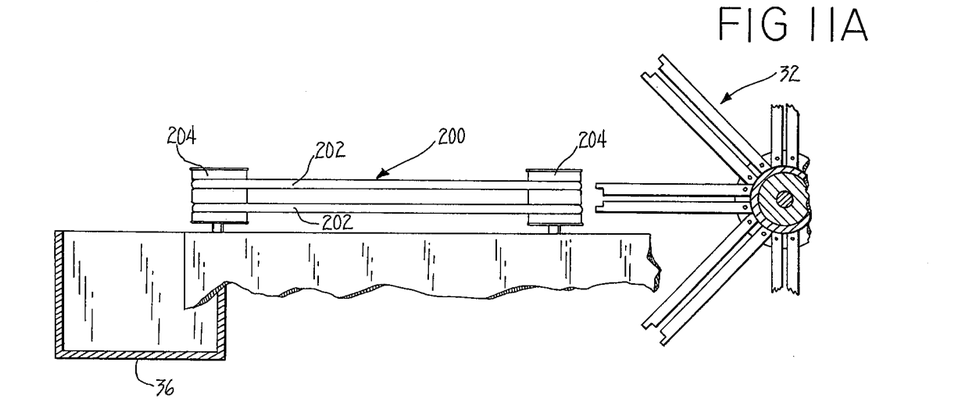
FIG. 11A is a cross-sectional view looking in the direction of line 11A—11A of FIG. 11.

Cooling wheel 34 can be replaced by a conveyor 200 (FIGS. 11 and 11A) which is comprised of two pairs of flexible, endless belts 202 mounted on respective pulleys 204 to move cake products away from conveyor wheel 32 and to deposit the products in container 36. The belts are preferably of solid material, such as neoprene, and the two pairs of belts are substantially close together to permit products to be frictionally engaged therebetween. One of the pulleys of each pair of belts is incrementally driven, such as by shaft 179, so that the products are incrementally advanced toward container 36. When the products are between the pairs of belts, the products are cooled to a generally rigid consistency and finally gravitate into container 36 after reaching the outer end of conveyor 200.

To make fortune cookies with the aforesaid apparatus, individual cakes 13 are placed one-by-one on plate structure 11. The caks will have previously been made in cooker unit 38 by pouring batter between the individual pairs of griddle plates 40 and 42. Conveyor 44 advances the pairs of griddle plates toward and into alignment with the upstream end of surfaces 12, 14 and 16. If the apparatus is to be operated automatically, mechanism 46 (FIG. 4) automatically operates to lift individual cakes from the cooker unit 38 to transfer them onto surfaces 12, 14 and 16. Mechanism 46 can be made to actutate in response to the position of each pair of griddle plates 40 and 42 with respect to conveyor 12.

In the alternative, cakes can be manually placed on conveyor 12 by an operator standing adjacent to apparatus 10 as shown in FIG. 1. The operator lifts the individual cakes by tongs and places them on conveyor 12.

Assuming a cake has been placed on surfaces 12, 14 and 16, a pair of lugs 33 or 35 moves the cake past electric eye device 88 causing valve 105 to open. The cake continues on and is deposited on supporting surface 16 of plate 15. Slide plate 98 moves upwardly due to the rotation of shaft 116 so that manifold 94 is raised and rotated through an arc of approximately 180° to align suction tubes 92 with the lowermost strip 22 of stack 24 carried by magazine 131. Bar 66 is moved toward plate structure 11 so that abutment means 20 moves the cake rearwardly slightly and against abutment surfaces 72 and 74 (FIG. 1) to center the cake over passage 18. Suction tubes 92 move into engagement with strip 22 and remove the strip by suction, then lower the strip into engagement with the cake centered with respect to passage 18. Tubes 92 then force the cake into the passage to fold the same about the aforeside first axis. This first fold is made with strip 22 on the cake since the positive air force created by the action of piston and cylinder assembly 102 removes the strip from suction tubes 92.

Rotation of arms 26 and 28 (FIG. 5) in opposite directions causes such arms to bend or fold the cake 13A about arm 30 after the product has been folded upon insertion thereof into passage 18. As the product is folded a second time, arm 30 can be stationary and provided with a delay mechanism 190 (FIG. 10) which delays the downward movement of arm 30 until the second fold has been substantially completed. In the alternative, the arm can be moved down slowly enough to cause folding of cake 13A yet the cake will be fully folded by the time it reaches wheel 32.

Conveyor wheel 32 is indexed so that a new carrier, including a set of four legs 168, moves into alignment with the downward path of travel of the folded cake product. Thus, as arm 30 is lowered, the cake product is received between the four legs 168 of the carrier and aligned therewith. Arm 30 does not descend completely away from the folded cake product inasmuch as the arm moves into the space between adjacent pairs of legs 168 (FIG. 5) to thereby clear wheel 32. The product stays on wheel 32 until the latter is indexed once again.

Cooling wheel 34 is also indexed for incremental movement. Thus, products carried thereby will progressively and incrementally be moved from a location at which they are transferred from conveyor wheel 32 to a location which permits time to gravitate into container 36.

As soon as container 36 is full, it is removed to a packaging station and is replaced with an empty container. Replacing the containers and keeping magazine 131 supplied with strips 22 are substantially the only functions that an operator need attend to if the aforesaid method is geared for automatic execution, i.e., when feed mechanism 46 is actuated. If the semiautomatic method is followed, the operator, of course, must feed cakes 14 in the manner shown in FIG. 1.

I claim:

1. A machine for making a shaped food product from a generally flat, foldable cake comprising: a support having a first fixed, flat upper surface for receiving the cake; means adjacent to said first surface and continuously movable relative thereto for advancing the cake in one direction over the same; means at one end of the first surface defining a second fixed, flat upper surface for receiving and supporting the cake, said second surface having an elongated, cake-receiving passage extending transversely of said one direction and downwardly from said second surface with the passage having a transverse dimension less than a corresponding transverse dimension of the cake, said moving means being disposed to advance the cake over said first surface and onto the second surface with said cake extending across the passage; reciprocal means including strip holding means to transfer a strip to said cake, continuously movable relative to said second surface for urging the cake disposed thereon into said passage to cause the cake to be folded about a first axis extending longitudinally of the passage; means including a pair of continuously moving members below said surface for folding the cake about a second axis transverse to the first axis; means adjacent to said folding means for receiving the cake and for moving the same to a location remote from said folding means; and means coupled to said advancing means, said urging means and said members for controlling the sequence of operation thereof.

2. A machine as set forth in claim 1, wherein said folding means further includes a central arm for supporting said cake at a position intermediate a pair of opposed ends thereof after the cake has moved downwardly in said passage, said members including a pair of rotatable arms engageable with the opposed sides of the folded cake to cause folding of the same about said central arm, the latter being movable downwardly after the second fold has been made to permit said cake to move into engagement with said receiving means.

3. A machine as set forth in claim 1, wherein said receiving means includes a wheel having a number of radial cake carriers, each carrier having structure at its outer end for receiving and advancing a folded cake along an arcuate path in a direction transverse to the direction of movement of said members.

4. A machine as set forth in claim 3, wherein each carrier comprises a group of spaced legs with the outer ends of the legs being in proximity to each other to present a cake-receiving seat movable into alignment with said slot at a location below the supporting surface.

5. A machine as set forth in claim 3, wherein is included a second wheel mounted for rotation adjacent to and horizontally aligned with the first-mentioned wheel for receiving and moving a cake away from said first wheel, and means coupled with said second wheel for rotating the same relative to said defining means whereby a cake carried by said second wheel can be cooled as it moves away from said first wheel.

6. A machine as set forth in claim 3, wherein is included an endless belt conveyor at one side of said wheel for receiving folded cakes one-by-one and being disposed to advance the products to a receiving station.

7. A machine for making a fortune cookie product from a generally flat, foldable cake comprising: means defining an elongated, flat, fixed surface for supporting the cake and having a passage therein at one end thereof, said passage having a width less than the minimum transverse dimension of said cake; means adjacent to the surface for causing said cake to slide over said surface toward said passage and into a position overlying the same; continuously moving strip holding means to transfer a strip to said cake movable toward and away from said surface for urging said cake disposed thereon into said slot to cause said cake to be folded about a first axis extending longitudinally of said slot; means below said surface and extending transversely of said slot for supporting an intermediate portion of said cake after the latter has been folded about said first axis; continuously moving means adjacent to said supporting means for folding said cake about a second axis transverse to said first axis when said intermediate portion is supported by said supporting means, the latter being movable downwardly to lower said cake after it has been folded about said second axis; means movable into alignment with the downward path of travel of said supporting means for receiving said cake and for moving the same to a location remote from said path; and means coupled with said causing means, said urging means, said supporting means and said folding means for controlling the sequence of operation thereof.

8. A machine as set forth in claim 7, wherein is included a magazine above said surface for holding a stack of individual strips, said urging means including an elongated suction device movable along a path extending between said magazine and said surface, and a suction source coupled with said suction device for providing a region of reduced air pressure at one end of said device, whereby a strip can be removed by suction from said stack by said device and placed on a cake in said position, said suction device being movable through a distance sufficient to force said cake into said slot to thereby fold said cake about said first axis when said strip is on said cake, and means coupled with said suction device for moving the same along said path.

9. A machine as set forth in claim 8, wherein said suction source includes a fluid piston and cylinder assembly having an air opening at one end of said cylinder, means coupled with said assembly for reciprocating the piston thereof relative to said cylinder, whereby a suction force is applied to said opening as said piston moves in one direction and air under pressure is applied to said opening when said piston moves in the opposite direction, said suction device including a manifold having a strip-engageable suction tube and means coupled with said cylinder at said opening thereof to place said manifold in fluid communication with said cylinder, said suction device moving means including a reciprocal plate, a bearing carried by and extending laterally from said plate, and means coupled with said plate for reciprocating the same, said manifold being rotatably mounted in said bearing, and cam means coupled with said manifold for rotating the same relative to said sleeve as a function of the position of the plate relative to said supporting surface, whereby said suction device will be moved along said path extending between said magazine and said supporting surface and a suction force or a positive air pressure force will be present at said device depending upon the location of said device relative to said surface.

10. A machine as set forth in claim 8, wherein said suction force includes a fluid piston and cylinder assembly having an air opening at each end of said cylinder, respectively, means coupled with said assembly for reciprocating said piston thereof relative to said cylinder to cause suction to be applied to said opening at one end of said cylinder, there being valve means responsive to the position of said suction device for alternately placing the openings of said cylinder in fluid communication with said device as a function of the location thereof relative to said surface, whereby suction can be applied thereto when the same is adjacent to said magazine and air under pressure can be applied to said suction device when the same is adjacent to said position.

11. A machine for making a fortune cookie product from a generally flat, foldable cake comprising: means defining an elongated, flat, fixed surface for supporting the cake and having a passage therein at one end thereof, said passage having a width less than the minimum transverse dimension of said cake; means adjacent to the surface for causing said cake to slide over said surface toward said passage and into a position overlying the same; continuously moving means movable toward and away from said surface for urging said cake disposed thereon into said slot to cause said cake to be folded about a first axis extending longitudinally of said slot; means below said surface and extending transversely of said slot for supporting an intermediate portion of said cake after the latter has been folded about said first axis; continuously moving means adjacent to said supporting means for folding said cake about a second axis transverse to said first axis when said intermediate portion is supported by said supporting means, the latter being movable downwardly to lower said cake after it has been folded about said second axis; means movable into alignment with the downward path of travel of said supporting means for receiving said cake and for moving the same to a location remote from said path; means coupled with said causing means, said urging means, said supporting means and said folding means for controlling the sequence of operation thereof, a shiftable abutment adjacent to said surface and aligned with the path of travel of said cake over the surface, and means coupled with said abutment for moving the same in a direction to cause the latter to move said cake through a limited distance and into a position at which said cake is substantially symmetrically located with respect to the slot.

12. A machine for making a fortune cookie product from a generally flat, foldable cake comprising: means defining an elongated, flat, fixed surface for supporting the cake and having a passage therein at one end thereof, said passage having a width less than the minimum transverse dimension of said cake; means adjacent to the surface for causing said cake to slide over said surface toward said passage and into a position overlying the same; continuously moving means movable toward and away from said surface for urging said cake disposed thereon into said slot to cause said cake to be folded about a first axis extending longitudinally of said slot; means below said surface and extending transversely of said slot for supporting an intermediate portion of said cake after the latter has been folded about said first axis; a pair of arms; means mounting the arms for rotation in opposed directions relative to said supporting means, said arms being operable for folding said cake about a second axis transverse to said first axis when said intermediate portion is supported by said supporting means, the latter being movable downwardly to lower said cake after it has been folded about said second axis; means movable into alignment with the downward path of travel of said supporting means for receiving said cake and for moving the same to a location remote from said path; and means coupled with said causing means, said urging means, said supporting means and said arms for controlling the sequence of operation thereof and for continuously rotating the arms.

13. A machine as set forth in claim 12, wherein the circular path of travel of the arms is below said surface, said supporting means including a rigid beam substantially midway between the axes of rotation of said arms.

14. A machine as set forth in claim 12, wherein each arm has a convex, product-engaging margin.

* * * * *